(12) United States Patent  
Bellabal

(10) Patent No.: US 10,184,401 B2  
(45) Date of Patent: Jan. 22, 2019

(54) TURBOJET ENGINE SUSPENSION USING A DOUBLE REAR SUPPORT

(71) Applicant: SNECMA, Paris (FR)

(72) Inventor: Francois Robert Bellabal, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 458 days.

(21) Appl. No.: 14/768,748

(22) PCT Filed: Feb. 17, 2014

(86) PCT No.: PCT/FR2014/050331  
§ 371 (c)(1),  
(2) Date: Aug. 18, 2015

(87) PCT Pub. No.: WO2014/128397  
PCT Pub. Date: Aug. 28, 2014

(65) Prior Publication Data  
US 2015/0377136 A1    Dec. 31, 2015

(30) Foreign Application Priority Data  
Feb. 20, 2013 (FR) ...................................... 13 51414

(51) Int. Cl.  
*F02C 7/20* (2006.01)  
*B64D 27/26* (2006.01)  
(Continued)

(52) U.S. Cl.  
CPC ................ *F02C 7/20* (2013.01); *B64D 27/26* (2013.01); *F01D 25/162* (2013.01); *F01D 25/28* (2013.01);  
(Continued)

(58) Field of Classification Search  
CPC .................................. F02C 7/20; F02K 3/025  
See application file for complete search history.

(56) References Cited

U.S. PATENT DOCUMENTS 4,266,741 A * 5/1981 Murphy ................. B64D 27/18  
244/54  
4,458,863 A * 7/1984 Smith .................... B64D 27/00  
239/265.29

(Continued)

FOREIGN PATENT DOCUMENTS

EP  2251540  11/2010  
FR  2891254  3/2007  
(Continued)

OTHER PUBLICATIONS

International Search Report, dated Jun. 12, 2014, Application No. PCT/FR2014/050331.

*Primary Examiner* — Mark Laurenzi  
*Assistant Examiner* — Shafiq Mian  
(74) *Attorney, Agent, or Firm* — Womble Bond Dickinson (US) LLP

(57) ABSTRACT

Bypass turbojet engine comprising a fan casing (5) at the front and an exhaust casing at the rear, said turbojet engine further comprising a cold stream duct (7) which comprises an annular rear end connected to the exhaust casing and on which is positioned at least one attachment point (4) able to transmit the load from the exhaust casing to the structure of an aircraft, characterized in that a plurality of attachment points (4g, 4d) is positioned on the circumference of said annular rear end of the cold stream duct (7), said plurality of attachment points comprising either two points (4g, 4d) that are diametrically opposed on said circumference or at least three points that form a polygon through which the axis of symmetry of the cold stream duct (7) passes, and in that the turbojet engine is equipped with a rear suspension hoop (8)

(Continued)

fixed to said attachment points and able to be fixed to the structure of the aircraft.

10 Claims, 2 Drawing Sheets

(51) Int. Cl.
 *F01D 25/16* (2006.01)
 *F01D 25/28* (2006.01)
 *F02K 3/06* (2006.01)
 *F02K 3/02* (2006.01)

(52) U.S. Cl.
 CPC .............. *F02K 3/025* (2013.01); *F02K 3/06* (2013.01); *F05D 2260/30* (2013.01); *Y02T 50/44* (2013.01); *Y02T 50/672* (2013.01)

(56) References Cited

U.S. PATENT DOCUMENTS

| | | | | |
|---|---|---|---|---|
| 4,469,730 A * | 9/1984 | Burhans | ............... | B29C 53/585 156/169 |
| 6,398,161 B1 * | 6/2002 | Jule | ............... | B64D 27/18 244/54 |
| 2002/0172593 A1 * | 11/2002 | Udall | ............... | B64D 27/16 415/126 |
| 2004/0245383 A1 * | 12/2004 | Udall | ............... | B64D 27/16 244/54 |
| 2007/0084218 A1 * | 4/2007 | Udall | ............... | F01D 9/041 60/796 |
| 2008/0272230 A1 * | 11/2008 | Diochon | ............... | B64D 27/26 244/54 |
| 2010/0170984 A1 * | 7/2010 | Journade | ............... | B64D 29/08 244/1 N |
| 2010/0242496 A1 * | 9/2010 | Cass | ............... | F02C 7/32 60/802 |
| 2011/0114786 A1 | 5/2011 | Guillet et al. | | |
| 2011/0154831 A1 | 6/2011 | Journade et al. | | |
| 2012/0051903 A1 | 3/2012 | Heyerman et al. | | |
| 2013/0160459 A1 * | 6/2013 | Thies | ............... | F02C 7/32 60/796 |
| 2013/0195635 A1 * | 8/2013 | Robertson, Jr. | ............... | F01D 11/122 415/197 |
| 2015/0367946 A1 * | 12/2015 | Boileau | ............... | B64D 29/08 244/54 |

FOREIGN PATENT DOCUMENTS

| | | |
|---|---|---|
| FR | 2916737 | 12/2008 |
| FR | 2920138 | 2/2009 |
| FR | 2928181 | 9/2009 |
| FR | 2940359 | 6/2010 |
| GB | 2021696 | 12/1979 |

* cited by examiner

TURBOJET ENGINE SUSPENSION USING A DOUBLE REAR SUPPORT

BACKGROUND OF THE INVENTION

(1) Field of the Invention

The field of the present invention is that of turbojet engines and the members which ensure the connection between the different parts thereof. It relates in particular to the members which ensure the mechanical strength of the bypass turbojet engines by means of the cold-flow channel thereof.

(2) Description of the Related Art

A propulsion engine, such as a turbojet engine, may be mounted at various points on the aeroplane, by being hung from a mast or strut forming part of the structure of said aeroplane. It may also be suspended under the wing, attached to the fuselage, generally to the rear, or mounted in the tail using appropriate hanging means. Said hanging means have the function of ensuring that mechanical stresses are transmitted between the engine and the structure of the aeroplane. The loads to be taken into consideration are in particular the weight of the engine along the vertical axis Z, the thrust thereof along the axis X of the engine and the lateral aerodynamic loads along the transverse axis Y. The loads to be transmitted also include the absorption of the torque about the axis of the engine. These means should also absorb, without transmitting them to the mast, the deformations sustained by the engine during the different flight phases which result, for example, from the dimensional variations caused by thermal expansions and contractions.

A mode of suspension, for example, for a front-fan turboshaft engine, consists in hanging the engine from a mast which is part of the structure of the aeroplane (fuselage or wing) by a suspension or front attachment and by a suspension or rear attachment. The front suspension is attached in particular to an intermediate casing which forms a flange at the rear of a fan casing, and the rear suspension is indirectly attached to the exhaust casing for the primary flow. Said two parts form the structural elements of a turbine engine and absorb all the stresses.

Modern turbojet engines are bypass turbine engines having a high bypass ratio, the secondary air flow being compressed by a single compressor stage referred to as a fan stage. In certain configurations, such as that described in FR2940359A1 by the applicant, the secondary air flow at the outlet of the fan is guided by a duct which opens directly into an exhaust nozzle for assisting with the thrust of the engine. This duct, referred to as a "cold-flow channel" herein, is generally referred to as an outer fan duct (OFD). It can be seen in FIG. 9 of FR2940359A1 under the reference numeral 116, and it extends the fan casing 110 towards the downstream end of the turbojet engine. The secondary flow thus circulates between the main body of the engine, which is defined by casings, and said duct or cold-flow channel. For reasons of weight, said cold-flow channel may, in a conventional manner, be made of composite material, such as a carbon-fibre composite material. Said channel is attached to the engine by connections positioned at the two longitudinal ends thereof, a first attachment being made at the upstream end on the intermediate casing and a second attachment being made at the rear on a structural ring which is arranged at the rear end of the channel and is supported by the exhaust casing. The downstream part of the exhaust nozzle, comprising the thrust inverter, is attached to the structural ring, which comprises an attachment flange for this purpose. In addition, the connection between the structural ring of the cold-flow channel and the exhaust casing is generally made by means of arms or profiled connecting rods which pass through the cold flow.

A particular problem may be encountered on these bypass engines having a cold-flow channel which arises both from the rigidity of the cold-flow channel, which may prove to be relatively low if the structure forming the channel is not sufficiently reinforced, and from the lever arm being between the axis in which the engine thrusts and the position, which is offset relative thereto, of the attachment points of the engine. Said lever arm and the torque which is associated therewith tend to deform the cold-flow channel if it is not sufficiently rigid, and tend to give it a "banana" shape between the attachment flange thereof at the front on the intermediate casing and the structural ring at the rear end thereof. The structural ring is also deformed by oval deformation in a substantially elliptical shape, of which the major axis passes through the point of attachment to the structure of the aircraft. The type of deformation encountered is shown in plan view and in a rear view in FIGS. 1 and 2, in the case of an engine which is supported by the wing of the aeroplane. Said distortions of the engine housing are obviously detrimental to the proper operation of the engine and to the performance thereof, owing to parasitic play between the parts thereof and to the mechanical strength of the attachments, which are stressed in a non-optimal direction.

In order to partly address this problem, it is possible to rigidify the cold-flow channel by reinforcing the structure thereof, including the structural ring, but this results in a significant increase in the weight thereof and therefore in the cost thereof.

BRIEF SUMMARY OF THE INVENTION

The present invention thus aims to overcome these drawbacks by proposing a type of connection between the rear end of the cold-flow channel and the structure of the aircraft which does not have the drawbacks of the prior art and, for this purpose, which eliminates the torque from the lever arm which is between the thrust of the engine and the retaining forces exerted by the front and rear suspension attachments of the turbine engine.

For this purpose, the invention relates to a bypass turbojet engine comprising a fan casing at the front and an exhaust casing at the rear, said turbojet engine further comprising a cold-flow channel which extends the fan casing in order to guide the cold flow towards the downstream end of the turbojet engine, said cold-flow channel comprising an annular rear end which is connected to the exhaust casing and on which at least one attachment point is positioned which is capable of transmitting the stresses from the exhaust casing to the structure of an aircraft, characterised in that a plurality of attachment points is positioned on the circumference of said annular rear end of the cold-flow channel, said plurality of attachment points comprising either two diametrically opposed points on said circumference or at least three points forming a polygon, within which the axis of symmetry of the cold-flow channel passes, and in that the turbojet engine is equipped with a rear-suspension hoop which is attached to said attachment points and is capable of being attached to the structure of the aircraft.

In this way, there is no longer a lever arm between the thrust force which is exerted by the engine along the rotational axis thereof and the forces which absorb this thrust, the attachment points of which are positioned over the circumference of the cold-flow channel. As a result, the main body of the engine is no longer subjected to a torque which would deform it and which would give the structural ring an oval shape. The specified play between the rotating parts and the stationary parts is maintained, and this eliminates the performance losses encountered in the prior art. If there are two attachment points, which are diametrically opposed, this configuration results in a minimal length of the parts which absorb the stresses transmitted by the exhaust casing and transmit them to the structure of the aircraft on which the turbojet engine is mounted.

Preferably, said hoop comprises a single attachment region which is capable of transmitting the stresses transmitted by the exhaust casing to the structure of the aircraft.

More preferably, the hoop is semi-circular, said single attachment region being in the middle thereof.

Advantageously, the annular rear end of the cold-flow channel comprises a structural ring. This ring may be produced, in a known manner, as a separate part of the structure of the channel, which is attached to said structure. Nevertheless, it is possible for a reinforcement of the rear end of the channel which acts as such a structural ring to be integrated into the structure of the channel during the manufacture thereof.

In an embodiment, the turbojet engine comprises an intermediate casing to which a front end of the cold-flow channel is attached.

Advantageously, a beam which is capable of ensuring the attachment of a front suspension of the turbojet engine to the structure of the aircraft is arranged on said intermediate casing.

Preferably, the turbojet engine is further equipped with a connection which is capable of attaching said single attachment region to a strut of the aircraft by allowing degrees of freedom in rotation of the turbojet engine along the longitudinal axis (X) thereof.

Moreover, the rear-suspension hoop may be made from a carbon-fibre sandwich composite, and this makes it possible to reduce the overall weight of the turbojet engine, since the increase in weight of the rear suspension is largely compensated by the saving in weight which is made possible by reducing the weight of the structure of the cold-flow channel. As detailed below, the invention makes it possible to reduce the weight of the structure of the cold-flow channel because it is possible to have a channel of lower rigidity without involving the drawbacks encountered in the prior art.

BRIEF DESCRIPTION OF THE SEVERAL VIEWS OF THE DRAWINGS

The invention will be better understood, and its other aims, details, features and advantages will become more clearly apparent upon reading the following detailed explanatory description of an embodiment of the invention given as a purely illustrative and non-limiting example, with reference to the accompanying schematic drawings, in which.

DETAILED DESCRIPTION OF THE INVENTION

Figure 1:
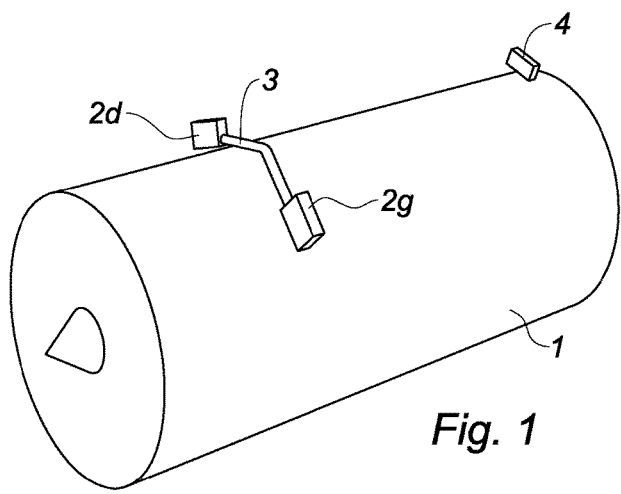
FIG. 1 is a schematic view of a turbojet engine and the points of attachment thereof to the structure of the aeroplane, according to the prior art.

With reference to FIG. 1, a stylised representation of a bypass turbojet engine 1 in the form a cylinder can be seen, in a configuration in which it is supported under the wing of the aeroplane. It comprises two series of attachment points: on one hand, two front attachment points, 2d and 2g, are located at the front of the engine in order to absorb the majority of the thrust stresses which are transmitted by the intermediate casing, and to support the weight of the front part, and on the other hand, a rear attachment point 4 which is located in the region of the exhaust casing, which supports the weight of the rear part. In a conventional manner, the front attachments 2d and 2g are interconnected by a beam 3 which ensures that the front suspension is attached to the mast or strut of the aeroplane.

The turbojet engine is shown in the configuration referred to as the pod configuration, under the wing, but it may equally be positioned laterally to the fuselage and may be retained by stationary attachments either on the fuselage or on the tail of the aeroplane. In this case, the turbojet engine is in a position in which it is rotated by 90°, either in one direction or in the other, relative to the configuration shown, and the stresses from supporting the weight by means of the attachments are distributed differently. However, whatever the configuration, the thrust which is directed axially is absorbed by front attachments which are in a position which is offset from the direction of the thrust.

Figure 2:
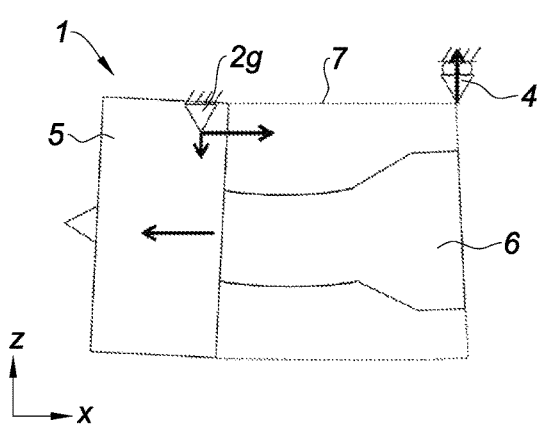
FIG. 2 is a schematic side view of the turbojet engine from FIG. 1, with the position of the attachment points thereof being indicated.
Figure 3:
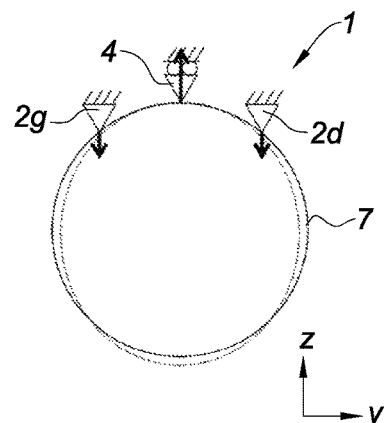
FIG. 3 is a schematic rear view of the turbojet engine from FIG. 1, with the position of the attachment points thereof being indicated.

FIGS. 2 and 3 show the offsets observed, assuming that the configuration is a pod engine, viewed from the side and the rear respectively. FIG. 2 shows a bypass turbojet engine 1 together with the fan casing 5 thereof which surrounds the front part of the engine, and in particular the fan (not shown), and the cold-flow channel 7 which extends the fan casing in order to guide the cold flow towards the downstream end of the engine and the secondary exhaust nozzle. The main body 6 of the engine, which contains the primary flow between the intermediate casing and the exhaust casing, has, as can be seen, a deformation in the shape of banana. This is caused by the lever arm which is between the direction of action of the thrust and that of the forces in reaction to the thrust which are exerted by the front attachment points 2g and 2d. This lever arm, which is substantially equal to the radius of the turbojet engine, generates a torque which is absorbed by forces exerted by the front attachment points 2g and 2d and by the rear attachment point 4. The drawings only show the forces in reaction to the thrust and to the absorption of the torque, without indicating the forces in reaction to the weight of the engine.

The deformation to which the main body 6 is subjected results in consumption of the play between the rotating parts and the stationary parts of the primary and secondary bodies of the engine, and this is extremely detrimental to the performance of the turbine engine and to the operational stability thereof.

FIG. 3 shows a different deformation resulting from the lever arm between the direction of the thrust and the reaction forces which are exerted on the attachments of the turbojet engine. Viewed from the rear, the cold-flow channel 7, which should be a regular circle, deforms into an oval shape of which the major axis is oriented according to the diameter passing through the rear attachment point 4. This oval deformation itself also contributes to the consumption of the internal play and to a reduction in the performance of the turbine engine.

Figure 4:
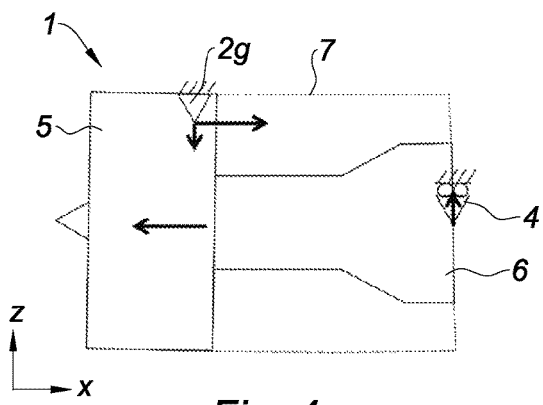
FIG. 4 is a schematic side view of a turbojet engine according to the invention, with the position of the attachment points thereof being indicated.
Figure 5:
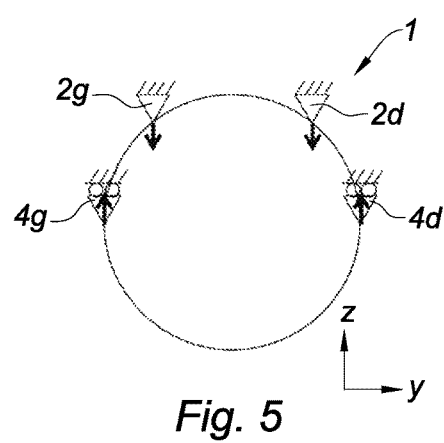
FIG. 5 is a schematic rear view of the turbojet engine according to the invention, with the position of the attachment points thereof being indicated.

FIGS. 4 and 5 show the absence of these deformations in the case of the invention. The front attachments 2g and 2d of the turbojet engine are, as above, positioned on either side of the plane of symmetry of the engine, in a high position. The lateral spacing between these two attachment points is dictated by the transverse stresses and the torques that they have to absorb. However, the rear suspension is implemented here by two rear attachments 4g and 4d which are diametrically opposed, in a plane which is perpendicular to the median plane of the two front attachments 2g and 2d. Because of this, the torque associated with the thrust is compensated by forces which are exerted at the same level as the thrust, and the oval-deformation phenomenon which was previously noted (cf. FIG. 3) can no longer occur. The internal play in the turbine engine is not worsened and the performance thereof is maintained.

Figure 6:
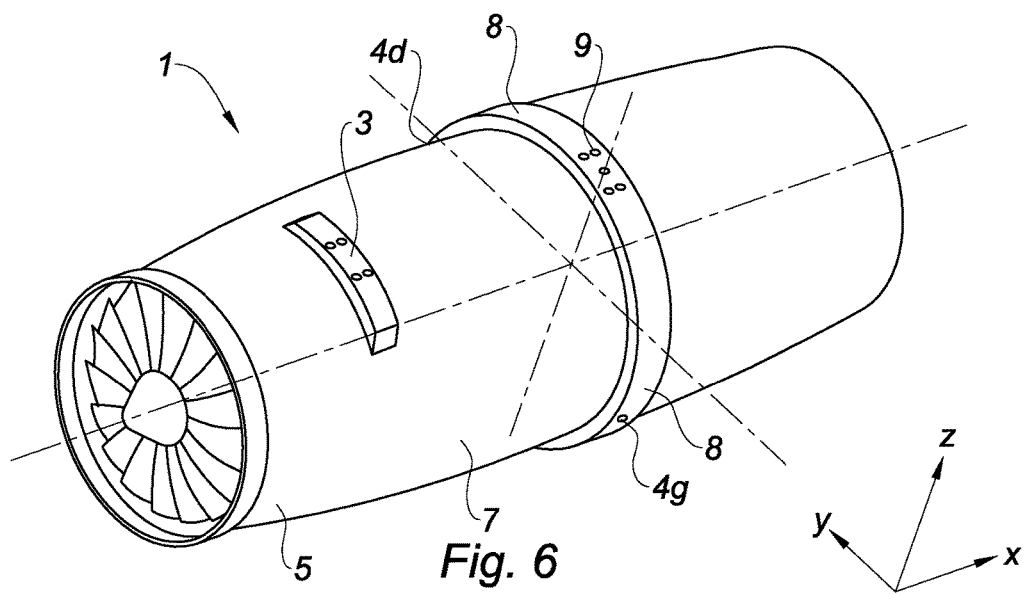
FIG. 6 is a perspective view of the turbojet engine from FIGS. 4 and 5, equipped with the devices thereof for hanging on the aeroplane.

FIG. 6 is a perspective view of a turbojet engine 1 equipped with a hoop 8 which connects the two rear attachment points 4g and 4d and ensures that the rear suspension is attached to the strut or to the mast of the structure of the aeroplane. This hoop is attached to the two rear attachment points 4g and 4d and comprises a region 9 for attachment to the strut, which fulfils the same functions as the single rear attachment 4 from the prior art.

Figure 7:
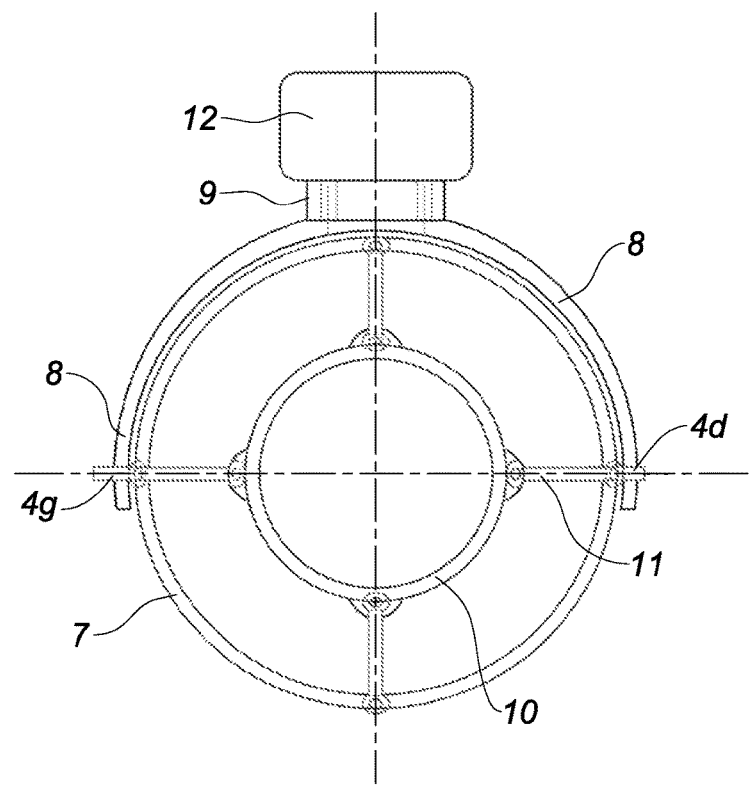
FIG. 7 is a cross section through the turbojet engine from FIG. 6 in the plane of the rear attachment thereof.

With reference now to FIG. 7, the turbojet engine 1 is shown in section in the region of the exhaust casing 10 and of the structural support ring of the cold-flow channel 7. The cold-flow channel 7 is conventionally connected to the exhaust casing 10 by means of connecting rods 11, at the ends of which reinforcements forming the attachment points 4g and 4d are located. Said reinforcements, as indicated above, are diametrically opposed on the circumference of the cold-flow channel 7. The hoop 8 which connects said reinforcements is, for this purpose, semi-circular and it surrounds the cold-flow channel, the attachment region 9 being in the middle thereof. Said hoop is attached to the strut 12 of the aeroplane by means of a connection which allows degrees of freedom in rotation and optionally in translation along the longitudinal axis x.

The contribution of the invention in terms of reducing deformations of the main body thereof, which are caused by the offset between the direction of the thrust of the engine and that of the absorption of these stresses by the front attachment points, will now be described.

The proposed solution consists in, for the rear suspension, having two hanging points 4g and 4d on the cold-flow channel 7, and in arranging them on the same diameter, opposite each other on the circumference of this channel. In this way, the duct cannot be deformed in an oval shape, even if this duct has a low rigidity. The technical solution proposed for connecting the two points for hanging from the strut is the use of a hoop 8 which connects the cold-flow channel to the hanging region 9 close to the strut.

The suspension hoop 8 makes it possible to absorb the stresses in the transverse directions y and z, while maintaining freedom of movement of the cold-flow channel in the axial direction. Indeed, since there is no axial stress (such as the engine thrust) to be absorbed, only the translation stresses need to be absorbed at each end of the hoop. These conditions, at specific limits, thus allow the engine to freely expand, and they limit the pre-stresses which are caused by the hyperstatics of the assembly.

Lastly, the reduction in the parasitic bending applied to the main body 6, owing to the arrangement maintained by the invention for the two rear attachment points, eliminates the consumption of play inside the turbine engine and improves the performance.

It may also be noted that this solution is different from the prior art, since it recommends positioning the points for attaching the strut to be further apart, while a person skilled in the art generally seeks to shorten the stress paths, so as to reduce the weight of the connecting part forming the rear suspension. The spacing between the points indeed involves either increasing the size of the rear suspension or introducing an additional interface part, and this again adds more weight. However, since the structural fan duct is thus stressed in a better manner, it behaves more like a beam which flexes at three points. The distribution of the shear flow is therefore better and the reinforcing capacity of the OFD on the secondary structure is substantially increased. A substantial amount of weight is therefore saved by reducing the intrinsic rigidity of the flow channel and by a minimal bending inertia with which the structural ring is provided, for which it is no longer necessary to take action to limit the oval deformation.

Moreover, since the structural ring does not have to prevent the oval deformation of the structural support ring of the cold-flow channel, the inertia of the middle section thereof can be reduced, and this results in an additional weight saving. Moreover, the reduction in the inertia of the ring makes it possible, by compensating for the position taken by the hoop, to bring the ring closer to the cold-flow channel and to reduce the radial size of the turbojet engine and, as a result, the aerodynamic drag associated therewith.

Lastly, the weight saving which is brought about by the reduction in the stresses associated with the design of these parts largely compensates for the additional weight of the hoop 8.

The invention has been described using a hoop comprising points to which the attachment points 4g and 4d of the structural ring are attached, these two points being diametrically opposed on the circumference of the cold-flow channel 7. The invention may also be implemented by positioning more than two attachment points on the ring, provided that these points are capable of absorbing the thrust force without a lever arm. This results in an arrangement according to which the rotational axis of the engine, that is to say the direction in which the thrust is exerted, intersects the inner surface of the geometric shape formed by the straight lines which join the different points.

The invention claimed is:
1. A bypass turbojet engine having a longitudinal axis and comprising a fan casing at a front and an exhaust casing at a rear along the longitudinal axis, said turbojet engine further comprising a main body, and
a cold-flow channel which extends the fan casing, said cold-flow channel extending between an annular front end and an annular rear end, the cold-flow channel surrounding the main body so that a cold flow circulates between the main body and the cold flow channel and towards a downstream end of the turbojet engine, said annular rear end being connected to the exhaust casing and on which at least one attachment point is positioned which is transmitting the stresses from the exhaust casing to a structure of an aircraft, wherein a plurality of attachment points is positioned on a circumference of said annular rear end of the cold-flow channel, said plurality of attachment points comprising either two diametrically opposed points on said circumference or at least three points forming a polygon, within which an axis of symmetry of the cold-flow channel passes, and in that the turbojet engine is equipped with a rear-suspension hoop which is attached to said attachment points and is capable of being attached to the structure of the aircraft.

2. The bypass turbojet engine according to claim 1, wherein said hoop comprises a single attachment region which is capable of transmitting the stresses transmitted by the exhaust casing to the structure of the aircraft.

3. The bypass turbojet engine according to claim 2, wherein the hoop is semi-circular, said single attachment region being in a middle thereof.

4. The bypass turbojet engine according to claim 1, wherein said annular rear end of the cold-flow channel comprises a structural ring.

5. The bypass turbojet engine according to claim 4, wherein said structural ring of the cold-flow channel is connected to the exhaust casing by means of at least two connecting rods, at ends of which reinforcements forming two points of said plurality of attachment points are positioned, the two points being diametrically opposed on a circumference of the structural ring.

6. The bypass Turbojet engine according to claim 1, comprising an intermediate casing to which the front end of the cold-flow channel is attached.

7. The bypass turbojet engine according to claim 6, wherein a beam which is capable of ensuring the attachment of a front suspension of the turbojet engine to the structure of the aircraft is arranged on said intermediate casing.

8. The bypass turbojet engine according to claim 2, which is further equipped with a connection which is capable of attaching said single attachment region to a strut of the aircraft by allowing degrees of freedom in rotation of the turbojet engine along the longitudinal axis thereof.

9. The bypass turbojet engine according to claim 1, wherein the hoop is made from a carbon-fibre sandwich composite.

10. The bypass turbojet engine according to claim 1, wherein the annular rear end of the cold flow channel surrounds the exhaust casing.

* * * * *